United States Patent

Rush

[15] 3,706,622

[45] Dec. 19, 1972

[54] METHOD OF ADHERING URETHANE FOAMS

[72] Inventor: Donald J. Rush, Grandview, Mo.

[73] Assignee: Butler Manufacturing Company, Kansas City, Mo.

[22] Filed: Jan. 22, 1970

[21] Appl. No.: 5,134

[52] U.S. Cl. ............... 156/306, 156/78, 156/331, 161/160, 161/190
[51] Int. Cl. .............................................. C09j 7/00
[58] Field of Search ........... 156/306, 78, 79; 161/190

[56] References Cited

UNITED STATES PATENTS

| | | | |
|---|---|---|---|
| 2,994,110 | 8/1961 | Hardy | 161/190 X |
| 3,463,698 | 8/1969 | Yanagihara et al. | 161/190 X |
| 3,563,845 | 2/1971 | Stevens | 161/190 X |
| 3,497,416 | 2/1970 | Critchfield et al. | 156/306 |
| 2,957,793 | 10/1960 | Dickey | 156/306 |
| 3,062,698 | 11/1962 | Aykanian | 156/306 |
| 3,205,120 | 9/1965 | Flanders | 156/306 |
| 3,362,862 | 1/1968 | King | 156/306 |
| 3,547,753 | 12/1970 | Sutton | 156/306 |

FOREIGN PATENTS OR APPLICATIONS

| | | | |
|---|---|---|---|
| 824,668 | 12/1959 | Great Britain | 156/306 |

OTHER PUBLICATIONS

Materials Handbook by G. S. Brady, 9th Edition McGraw-Hill Book Co New York 1963 page 795

*Primary Examiner*—Reuben Epstein
*Attorney*—Shoemaker & Mattare

[57] ABSTRACT

A method of adhering rigid urethane foam to itself and to various substrates, such as paper and metal, by means of carefully controlling heat and pressure. The polyurethane foams capable of adhesion are those which allow a post cure at elevated temperature subsequent to their original formation.

3 Claims, No Drawings

METHOD OF ADHERING URETHANE FOAMS

BACKGROUND OF THE INVENTION

1. Field of the Invention

The present invention contemplates a novel method of adhering urethane foam to itself and to other substrates merely by heat and carefully controlled pressure.

2. Description of the Prior Art

It has been known for many years that thermoplastic foams, such as polystyrene, can be melted and bonded to other materials. It has also been known, however, that in order to bond polyurethanes to other materials or to themselves an adhesive has been required. The use of adhesives have required subsequent steps to the foaming process along with the necessity of special apparatus. Even with the use of adhesives, these processes have resulted in interface imperfections, such as voids, and also residual thermoplasticity after the foam has cooled.

There would be, therefore, advantages for a new method of adhering thermosetting polyurethane foams to selected materials and for joining polyurethane foams to themselves. This is particularly true when the foams are used in structural and insulating capacity, such as in sandwich panels, in view of the fact that there would be no necessity for using other adhering materials. There is also no necessity for obtaining particular adhesives which would be compatible with the foam and with the materials to which it would be adhered.

SUMMARY OF THE INVENTION

It is accordingly one object of the present invention to provide a new process for adhering urethane foam to itself and to selected materials wherein no adhesive is necessary.

Another object of the invention is to set forth a new process wherein temperature and pressure are carefully controlled so as to adhere a certain class of polyurethane foams to materials and to itself without the necessity of an adhesive.

Yet another object of the invention resides in the production of foam sandwiches wherein there is improved adhesion to the foam and no residual plasticity after cooling.

A further object of the invention resides in the method for improving the adhesion of selected materials to thermosetting polyurethane foams having improved surface or interfacial characteristics of the composite.

These and other advantages of the present invention will become apparent from the following description and examples.

In accordance with the above objects, it has been found that certain thermosetting polyurethane foams which are susceptible to post curing after foaming can be adhered to themselves and to other selected materials by carefully controlling the pressure and the temperature to which they are subjected.

The polyurethane foams which are capable of post curing are those foams produced by reacting a polyisocyanate with a methylol resin having reactive methylol groups, a pH preferably higher than 3.0 and a water content not in excess of about 10 percent. While the phenolic methylol resins are preferred, similar results can be obtained starting with methylol resins based upon compounds such as urea, melamine, aniline and paratoluene sulfonamide. With regard to the polyisocyanate, any polyisocyanates ordinarily used in polyurethane foam production can be used with these resins. The component parts are present in a ratio of one-half to 1½ parts by weight of polyisocyanate to 1 part by weight of methylol resin.

To improve the physical properties of the above formed foamed resins, they are usually cured at a temperature of from 250°–500°F., or for periods of time averaging about one-half to 1 hour.

It has been found that by applying heat (e.g., 350°–400°F.) and very low pressures for less than a minute to a rigid or a flexible adherent material, such as paper, metal, coated paper, or to foam, while such is in contact with a methylol polyurethane foam which has not yet been post cured, an improved degree of adhesion of skin to cellular plastic or cellular plastic to cellular plastic can be obtained. The heat and pressure soften and partially tackify the cellular plastic, which is compressed and densified near its heated surface causing a smoothing or flattening of the treated surface.

This process has the advantage of improved adhesion of selected skins to a cellular plastic thermosetting polyurethane foam). No adhesives or adhesion promoters are required and adhesion is obtained in a very short time. There is a reduction of slight interface imperfections, such as voids, when pressure is applied to the softened cellular plastic. There is no liquid stage and post sizing of panels to thickness while improving adhesion is effected without any residual thermoplasticity after the foam has cooled.

Description of the Preferred Embodiments

In accordance with the present invention, there has been found a new method of adhesively bonding thermosetting polyurethane foam to itself and to various other substrates. The particular urethane foam is that foam capable of being post cured (e.g., a urethane foam formed from a polymethylol resin and a polyisocyanate).

Subsequent to foaming and prior to post curing, the foam under moderate pressure and temperatures of from 350°–400°F. can be adhered to themselves or to other substrates, such as metal, paper or coated paper.

The following specific examples will more clearly define and illustrate the invention:

EXAMPLE I

A foamed-in-place, paper-skinned panel was made consisting of two paper (kraft liner board) skins. On one a foamable phenolic-isocyanate mix was poured which expanded, rose and contacted the top skin. The panel was cooled to room temperature. It was placed between ½ inch thick aluminum plates, which had been preheated to about 350°F., for about 1 minute. The weight of the top plate supplied about 0.1 psi to the panel. The bond was paper-tearing as demonstrated by a peel test. Additional benefits were apparent in that the panel surfaces (skins) were smoothed, removing waves or wrinkles, and the foam interface was densified, which provided a stronger and more damage resistant panel surface. An identical panel which was not treated by the above method offered little or no paperto-foam bond, contained slight waves on its surface and had a softer surface.

EXAMPLE II

Two rectangular pieces of the plastic foam described above, with saw-cut surfaces about 1¼ inches thick, were placed in an end-to-end contact relationship. A ¼ inch thick strip of the same foam was placed on both sides of the narrow gap defining the end-to-end joint, the strips completely covering and overlapping the joint. The foam assembly was placed between aluminum plates, which were preheated to about 400°F. and were fitted with 1 inch spacers. Moderate pressure was applied to the heated plates which softened the foam strips and compressed them into the surface of larger pieces of foam, covering their joint and compressing the overall foam panel thickness to 1 inch while densifying its surface. The strips sealed the joint and firmly adhered the sections together forming a strong joint or splice.

EXAMPLE III

A piece of kraft liner board (26 pound), which had been coated on both sides with a pigmented potassium silicate liquid mix and allowed to dry, was rolled, with moderate pressure, onto the natural (as-foamed) skin surface of the plastic foam described above, with a 400°F. (initial temp.) aluminum rolling pin. The coated paper adhered to the foam surface and the foam was compressed and densified near its surface.

Having thus described the process of the instant invention in terms of its specific embodiments which are set forth in the description and the examples of the aforesaid specification, it is apparent to those skilled in the art that various changes and modifications can be made in the process without departing from the spirit and scope of the invention.

I claim:

1. A process of bonding rigid, thermosetting polyurethane foam to itself and to other substrates, said polyurethane foam being capable of being postcured and formed by reacting a methylol resin with a polyisocyanate in a ratio of one-half to 1½ parts by weigh of polyisocyanate to 1 part by weight of methylol resin, the methylol resin having reactive methylol groups, a pH of at least 3 and a water content of less than 10 percent, comprising placing the foam next to the substrate to which it is to be bonded and applying heat of a temperature of about 350° to 400° F. and moderate pressure.

2. The process of claim 1 wherein the pressure applied is 0.1 psi.

3. The process of claim 1 wherein the substrates are selected from the group consisting of polyurethane foam, paper, metal and coated paper.

* * * * *